March 14, 1939.  J. MERCIER  2,150,390
VALVE WITH CONSTANT CALIBRATION
Filed Dec. 13, 1937
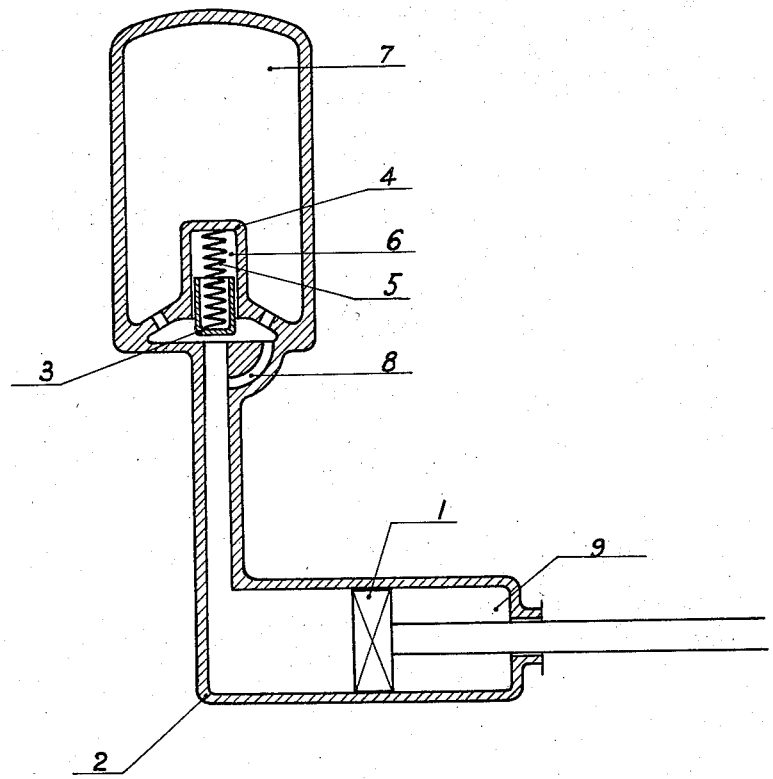
Jean Mercier
INVENTOR
By Otto Munk
his ATTY.

UNITED STATES PATENT OFFICE 2,150,390

VALVE WITH CONSTANT CALIBRATION

Jean Mercier, Neuilly-sur-Seine, France

Application December 13, 1937, Serial No. 179,380
In France October 11, 1937

2 Claims. (Cl. 267—65)

The present invention has for its object to render a safety valve independent of the variations of pressure of the space in which the fluid at excessive pressure is discharged, even though the pressure in the said space should be subject to great variations.

This result is obtained by separating, from the space in which the fluid at excessive pressure is discharged, the face of the valve which is usually subjected to such pressure, and by subjecting it to the pressure, which is practically constant, prevailing in an annexed chamber.

As an accessory feature, the said annexed chamber may communicate with the space having the variable pressure, through a very small orifice which provides for the balancing of the pressures when the apparatus remains for a greater or less time out of action.

The accompanying figure represents a piston 1 which is movable in a cylinder 2 and may thus produce excessive pressures of fluid, which latter will flow into a chamber 7 by lifting a valve 3 which is subjected on one side to the variable pressure prevailing in the cylinder 2, and on the other side to the pressure in an annexed chamber 6 operating at a practically constant pressure, to which may be added the pressure of a calibrated spring 5.

It is thus evident that during the forward motion of the piston 1, which can be used as a shock-absorber, the reaction due to the pressure in the cylinder 2 will be constant, whatever be the quantity of fluid discharged into the chamber 7, and the return to the normal may be effected by a very small orifice 8, which might be adjustable or even controlled by a check-valve (not shown) which allows the fluid to flow only in the direction from the chamber 7 towards the cylinder 2.

A chamber 9 filled with fluid may be used as a buffer for damping the end of the back motion of the piston.

Having now described my invention, what I claim as new and desire to secure by Letters Patent, is:

1. In a shock-absorber or like device, a compression chamber, another chamber connected with the first one and adapted to receive the fluid during its compression in said first chamber, valve means between said two chambers and a third chamber independent and isolated of the two first chambers, said valve means having one face subjected to the pressure prevailing in said first chamber and the opposite face subjected to the pressure prevailing in said third chamber, and further always open connecting means of small diameter between said first two chambers for balancing the pressures in these chambers.

2. In a shock absorber or like device, a chamber of variable content, another chamber of constant volume, connecting means between said two chambers, valve means controlling said connecting means and the flow of fluid from the first chamber into the second, an auxiliary chamber independent and isolated of the two first ones, said valve means being subjected on one of its faces to the action of the fluid in said first chamber and on the other face to the action of the pressure prevailing in said third chamber, a spring located in said latter chamber and acting upon said valve means in the same direction as the fluid in this chamber, and further channel means of small section directly and permanently connecting said first and second chambers, for balancing the pressure in these chambers.

JEAN MERCIER.